United States Patent
Lavigne et al.

(10) Patent No.: US 8,973,725 B2
(45) Date of Patent: Mar. 10, 2015

(54) SHOCK STRUT WITH PRESSURE RELIEF

(75) Inventors: Paul J. Lavigne, Burlington (CA); Paul Vanderpol, Brampton (CA)

(73) Assignee: Goodrich Corporation, Charlotte, NC (US)

( * ) Notice: Subject to any disclaimer, the term of this patent is extended or adjusted under 35 U.S.C. 154(b) by 552 days.

(21) Appl. No.: 12/737,483

(22) PCT Filed: Jul. 21, 2009

(86) PCT No.: PCT/US2009/051227
§ 371 (c)(1),
(2), (4) Date: Apr. 15, 2011

(87) PCT Pub. No.: WO2010/011635
PCT Pub. Date: Jan. 28, 2010

(65) Prior Publication Data
US 2011/0209955 A1    Sep. 1, 2011

Related U.S. Application Data

(60) Provisional application No. 61/082,417, filed on Jul. 21, 2008.

(51) Int. Cl.
*F16F 9/00*    (2006.01)
*B64C 25/60*   (2006.01)

(52) U.S. Cl.
CPC ..................................... *B64C 25/60* (2013.01)
USPC .................... 188/269; 244/104 FP; 267/64.26

(58) Field of Classification Search
CPC ............ F16F 9/145; F16F 9/06; B64C 25/60; B64F 2700/6226
USPC ... 244/104 FP, 102 R, 103 R, 102 A, 102 SS; 267/64.11, 64.15, 64.25, 64.26, 64.28, 267/217; 188/266.8, 269, 280, 281, 282.1, 188/297, 314, 316, 317, 322.13, 322.15
See application file for complete search history.

(56) References Cited

U.S. PATENT DOCUMENTS

| | | | | |
|---|---|---|---|---|
| 1,886,712 A | * | 11/1932 | Messier | 267/64.15 |
| 2,356,481 A | * | 8/1944 | Thornhill | 267/64.15 |

(Continued)

FOREIGN PATENT DOCUMENTS

| | | | | |
|---|---|---|---|---|
| FR | 849258 A | * | 11/1939 | B64C 25/60 |
| GB | 2057629 A |   | 4/1981 | |

(Continued)

OTHER PUBLICATIONS

International Search Report of priority Application No. PCT/US2009/051227.

(Continued)

*Primary Examiner* — Bradley King
*Assistant Examiner* — Stephen Bowes
(74) *Attorney, Agent, or Firm* — Snell & Wilmer L.L.P.

(57) ABSTRACT

A shock strut includes a relief device that reduces the internal pressure within a sealed chamber of the shock strut when a load condition that exceeds a maximum operating load condition is encountered. The reduced pressure permits a telescopically moving piston of the shock strut to be received into a corresponding cylinder to an amount that increases the structural capability of the shock strut, especially with respect to applied side loads that generate bending and shearing stresses in the shock strut. In one embodiment, the reduced pressure permits the piston to "bottom out" relative to the cylinder, which is a condition not otherwise achievable without the relief device. This additional stroke achievable by the piston reduces or eliminates the need to reinforce and thus add weight to the shock strut because of higher load condition design requirements.

10 Claims, 3 Drawing Sheets

(56) References Cited

U.S. PATENT DOCUMENTS

| | | | |
|---|---|---|---|
| 2,593,372 A * | 4/1952 | Watts | 267/64.22 |
| 3,145,985 A * | 8/1964 | Bourcier | 267/64.16 |
| 3,164,381 A * | 1/1965 | Tuczek | 267/64.15 |
| 3,237,726 A * | 3/1966 | Deyerling | 188/269 |
| 4,291,850 A * | 9/1981 | Sharples | 244/102 SS |
| 4,405,119 A * | 9/1983 | Masclet et al. | 267/64.22 |
| 4,506,869 A * | 3/1985 | Masclet et al. | 267/64.15 |
| 4,537,374 A * | 8/1985 | Barnoin et al. | 244/102 R |
| 4,702,438 A | 10/1987 | Levy et al. | |
| 5,094,407 A * | 3/1992 | Jampy et al. | 244/104 FP |
| 5,538,276 A * | 7/1996 | Tullis | 280/124.158 |
| 6,085,501 A * | 7/2000 | Walch et al. | 56/10.2 E |
| 2005/0211831 A1* | 9/2005 | Courtois et al. | 244/102 R |
| 2010/0187353 A1* | 7/2010 | Masson et al. | 244/104 FP |

FOREIGN PATENT DOCUMENTS

| | | | | |
|---|---|---|---|---|
| GB | 1592518 A | * | 7/1981 | F16F 9/08 |
| SU | 1120127 A1 | * | 10/1984 | F16F 9/06 |
| SU | 1677406 A1 | * | 9/1991 | F16F 9/06 |

OTHER PUBLICATIONS

International Preliminary Report on Patentability dated Jan. 25, 2011 for PCT/US2009/051227.

Examination Report of the European Patent Office dated Dec. 15, 2011 for European Patent Application No. 09790667.

* cited by examiner

SHOCK STRUT WITH PRESSURE RELIEF

PRIORITY CLAIM

This application claims the benefit of U.S. Provisional Patent Application No. 61/082,417, filed on Jul. 21, 2008, the content of which is incorporated by reference herein in its entirety.

FIELD OF INVENTION

The present invention relates to aircraft landing gear systems having shock struts for absorbing, damping and/or reacting forces encountered during operation of an aircraft, and more specifically to an "air-over-oil" shock strut.

BACKGROUND OF THE INVENTION

Shock struts are used in a wide variety of vehicle suspension systems for controlling motion of the vehicle and its tires with respect to the ground and for reducing transmission of transient forces from the ground to the vehicle. Shock struts are a common and necessary component in most aircraft landing gear systems. The shock struts used in aircraft landing gear systems are subjected to more demanding performance requirements and operational conditions because the shock strut must control motion of the landing gear and absorb, damp and react forces or loads imposed on the landing gear during landing, taxiing, takeoff, maintenance and other operational conditions.

The shock strut generally accomplishes these functions by compressing a fluid within a sealed chamber formed by hollow, telescoping cylinders. The fluid generally includes both a gas and a liquid, in which the liquid may take the form of hydraulic fluid or oil. One type of shock strut is generally referred to as an "air-over-oil" shock strut where a trapped volume of gas is compressed and a volume of the liquid is metered through an orifice in one of the telescoping cylinders when the shock strut is axially or longitudinally compressed. The gas operates as an energy storage device, similar conceptually to a mechanical a spring, so that upon termination of a compressing force the shock strut returns to its original length. Shock struts also dissipate energy by passing the liquid through the orifice so that as the shock strut is compressed or extended, its rate of motion is limited by the damping action that occurs from the liquid being forced through the orifice.

Landing gear systems for aircraft are qualified and certified based upon various operational loads and shock strut stroke parameters. These loads typically include a limit load for both structural certification and design validation. Using the limit load, an ultimate load factor may be applied to achieve an acceptable and often required maximum structural capability. The ultimate load factor is typically 1.5 times the limit load, but may have other values or additional factors of safety based on design or certification criteria. By way of example, the aforementioned limit and ultimate load requirements are defined in the Federal Aviation Regulations for commercial aircraft that will operate within the boundaries of the United States or its territories.

For the shock strut in particular, these load requirements general dictate the structural arrangement of the shock strut components based upon a combination of bending and column stability. For example, structural sizing of at least one or more of the shock strut components may be driven by the in-stroke characteristics of the shock strut in combination with applied vertical loads, applied drag loads, and applied side loads. In view of the load requirements and the commonly applied structural sizing analyses, it is often a substantial challenge to reduce an overall weight of various landing gear systems.

SUMMARY OF THE INVENTION

The shock strut system described herein may advantageously satisfy the load requirements of a landing gear system without having to increase an overall weight of the shock strut system. The shock strut includes a pressure relief device in fluid communication with an internal chamber of the shock strut (or shock absorber). The pressure relief device operates to reduce a pressure within the internal chamber when an applied load on the landing gear system results in a chamber pressure that is greater than a maximum operating chamber pressure of the shock strut. This reduction in pressure permits a piston of the shock strut to non-resiliently collapse or optionally be fully received (e.g., full stroke or "bottom out") into a mating shock strut cylinder. The additional, structural overlap between the piston and cylinder during the aforementioned collapse increases at least one of a bending, side load, or shearing capability of the shock strut while maintaining or even reducing the overall weight of the shock strut system as compared to conventional shock systems without pressure relief devices.

In one aspect of the invention, an aircraft landing gear shock strut includes a cylinder; a piston telescopically movable within the cylinder to provide a piston-cylinder assembly; a sealed chamber defined by an arrangement of the piston-cylinder assembly, the sealed chamber having a compressible gas that resists movement of the piston relative to the cylinder when a load applied to the strut causes the piston to compress the compressible gas; and a relief device in fluid communication with the sealed chamber having the compressible gas, the relief device configured to release at least some of the compressible gas when the load applied to the strut exceeds a desired threshold, wherein the amount of compressible gas released is sufficient to reduce the pressure in the sealed chamber and thereby permit the piston to extend telescopically further into the cylinder by an amount that increases at least a bending strength capability of the piston-cylinder assembly.

In another aspect of the invention, an aircraft landing gear shock strut includes a cylinder; a piston telescopically movable within the cylinder to provide a piston-cylinder assembly; a sealed chamber defined by an arrangement of the piston-cylinder assembly, the sealed chamber having a compressible gas in fluid communication with a hydraulic liquid, the compressible gas and liquid configured to resist movement of the piston relative to the cylinder, wherein the piston is movable to a first position within the cylinder when the compressible gas reaches a maximum operating pressure; and a relief device in fluid communication with the sealed chamber, the relief device activatable to release at least some of the compressible gas when the pressure of the compressible gas reaches a desired pressure that is above the maximum operating pressure, wherein activation of the relief device permits the piston to telescopically move beyond the first position to increase a side load capability of the piston-cylinder assembly.

And, in yet another aspect of the invention, a method for operating a shock strut of a landing gear includes the steps of (1) telescopically moving a piston into a cylinder of a piston-cylinder assembly of the shock strut, wherein movement of the piston is resisted by a compressible gas located within a sealed chamber defined by an arrangement of the piston and the cylinder; (2) pressurizing the compressible gas to a first pressure; (3) after exceeding the first pressure, activating a relief device in fluid communication with the sealed chamber; (4) venting at least some of the compressible gas out of the sealed chamber; and (5) telescopically moving the piston further into the cylinder to increase a side load capability of the shock strut.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with landing gear systems and the assembly and operation thereof have not necessarily been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

In addition, throughout the specification and claims which follow, the term "resilient" (or variations thereof) is meant to be a broad term relating to how compressed gas in a chamber of the shock strut will cause the shock strut piston to spring back when applied load on the shock strut system is reduced. Likewise, the term "non-resilient" (or variations thereof) is meant to distinguish from resilient compression of the shock strut under normal and even maximum operating applied loads.

Figure 1:
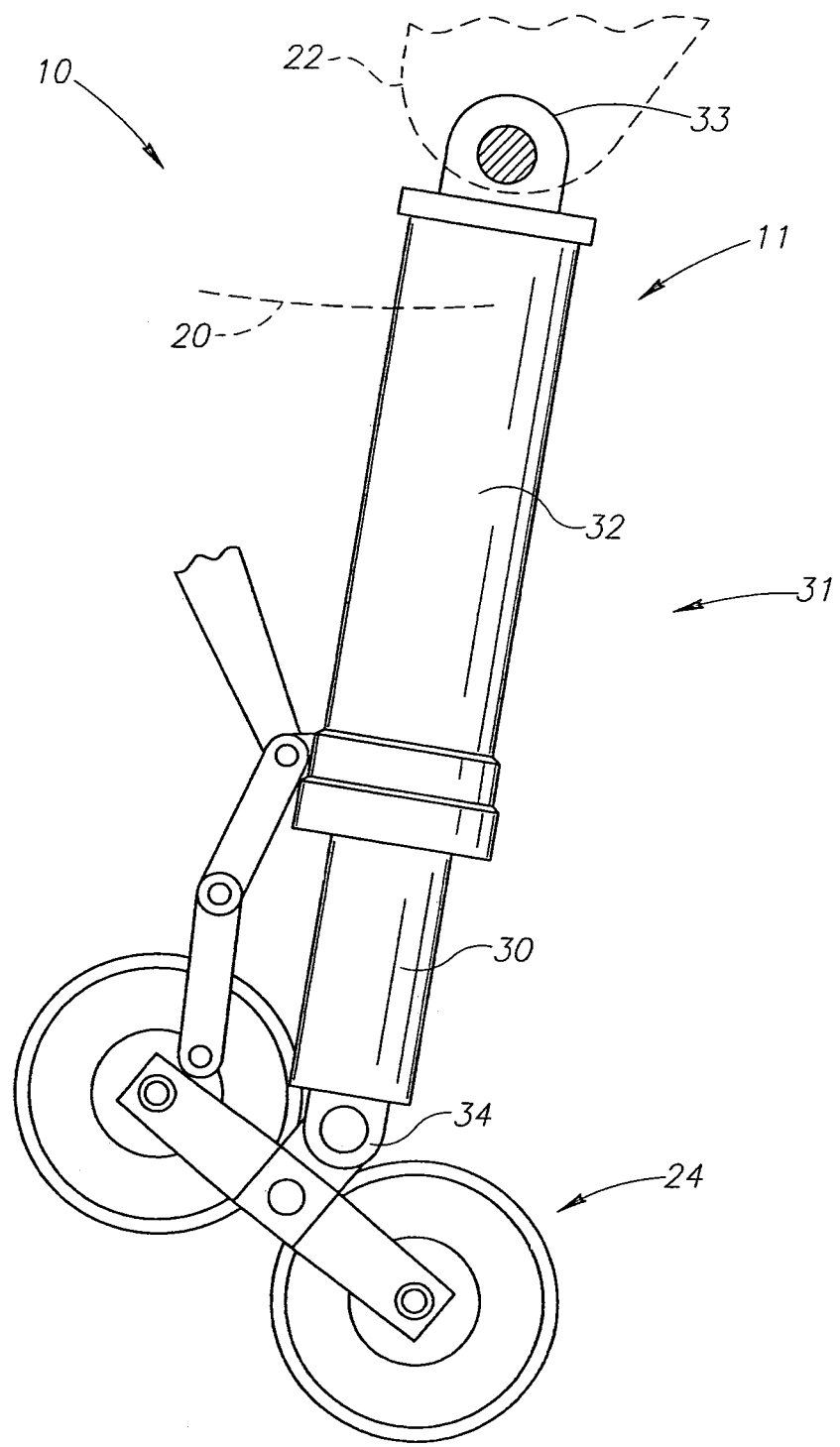
FIG. 1 is a schematic elevational view of a landing gear assembly incorporating a shock strut system according to an embodiment of the present invention.

FIG. 1 shows a landing gear system 10 with a shock strut 11 having an upper end mounted to an aircraft 20 by way of an attachment member 22. The shock strut 11, which may also be referred to as a shock absorber, may take a variety of forms provided that it includes an internal working fluid. A lower end of the shock strut 11 attaches to a wheel assembly 24. The aircraft 20 and attachment member 22 are shown in an outline (e.g., dashed line) form for the purpose of brevity and to avoid obscuring other details related to the shock strut 11.

The shock strut 11 includes a pair of telescopically movable members in which the inner movable member is generally referred to as a piston 30 and the outer member is typically referred to as a cylinder 32. The piston 30 and cylinder 32, in combination, form a piston-cylinder assembly 31. The cylinder 32 may be cylindrical, which is customary and most often structurally necessary, or some other shape, if desired. The piston-cylinder assembly 31 includes and upper mounting tab or boss 33 for attachment to the aircraft 20 and a lower mounting tab or boss 34 for attachment to the wheel assembly 24. The piston-cylinder assembly 31 provides a structural load path from the aircraft 20 to the wheel assembly 24. In the illustrated embodiment, the cylinder 32 receives the piston 30 in a manner that permits relative telescoping movement between the cylinder 32 and the piston 30. During operation, the shock strut 11 primarily operates to absorb and dampen forces transmitted between the aircraft 20 and the wheel assembly 24.

Figure 2:
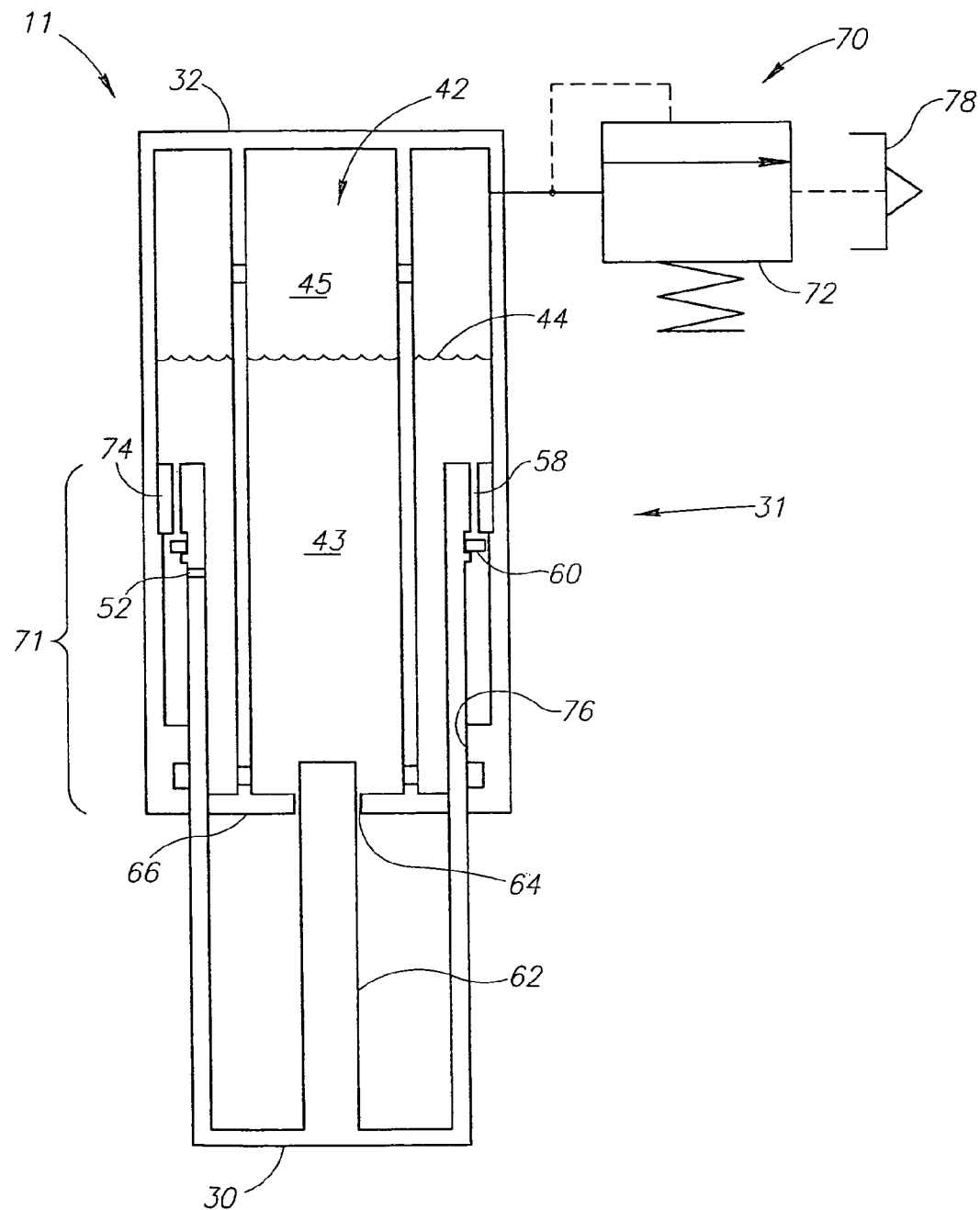
FIG. 2 is a schematic cross-sectional view of a single chamber shock strut with a relief device according to an embodiment of the present invention.

FIG. 2 shows that an arrangement of the piston 30 and the cylinder 32 of the shock strut 11 defines a sealed elongate chamber 42 filled with at least a liquid 43 and a compressible gas 45. The liquid may be a hydraulic fluid, oil or some other liquid generally used in pressurized systems. The compressible gas 45 may take the form of air, Nitrogen, or some other compressible fluid. The liquid 43 may be filled to a desired level, such as a nominal or full level, indicated generally by a liquid fill line 44.

The above-described shock strut 11 is commonly referred to as an "air-over-oil" shock strut even though the gas 45 may be other than air. The compressible gas 45 is pressurized and the chamber 42 is sealed relative to the atmosphere outside the strut 11. Various sealing arrangements may be employed to permit telescoping movement between the piston 30 and the cylinder 32 while maintaining an appropriate seal. The chamber 42 may take the form of a single chamber or a plurality of chambers as will be described in greater detail below.

A metering tube pin 62 is coupled to the piston 30 and received by a plate orifice 64 extending through an orifice plate 66. The metering pin 62 moves through the plate opening 64 as the piston 30 is telescopically received into the cylinder 32. The metering pin 62 allows a relatively rapid flow of the liquid 43 through the plate opening 64 when the shock strut 11 is at or near its fully extended position and is being compressed, and restricts flow through the plate opening 64 when the shock strut 11 is in or near a compressed configuration.

The piston 30 includes a piston orifice 52 situated within a portion of the chamber 42 containing the liquid 43. A metering orifice 58 and a valve 60 cooperate to regulate the size of the area through which the liquid 43 may flow, which in turn increases a resistance to further compression of the gas 45 and may help control a moving rate of the piston 30 relative to the cylinder 32 when an applied load to the shock strut 11 has changed. The metering orifice 58 and valve 60 also restricts flow of the liquid 43 when the shock strut 11 rebounds from the compressed configuration to an extended or non-compressed configuration.

Under normal operating conditions, the shock strut 11 functions to react and dampen loads imposed on the landing gear during such conditions as landing, taxiing, takeoff and maintenance. The compressible gas 45 within the sealed chamber 42 is compressed as the piston 30 telescopically moves deeper into the cylinder 32 (i.e., the shock strut 11 is axially compressed), and a volume of the liquid 43 is metered through the piston orifice 52. The compressible gas 45 functions as an energy storage device, conceptually similar to a spring, so that upon the release of the load applied to the landing gear, the shock strut 11 resiliently returns to its original length. The shock strut 11 also dissipates energy by passing the volume of the liquid 43 through the orifices 52, 58 and 66.

To provide the shock strut 11 within an increased structural capability under higher load conditions, for example load conditions that exceed a maximum operating load applied to the landing gear, the shock strut 11 includes a relief device 70. In one embodiment, the relief device 70 reduces the pressure of the compressible gas 45 in the sealed chamber 42 to cause a non-resilient collapse of the piston 30 into the cylinder 32. Alternatively stated, the relief device 70 permits the piston to extend telescopically further into the cylinder by an amount that increases at least a bending strength capability of the piston-cylinder assembly 31. A longitudinal overlap 71 between the piston 30 and the cylinder 32 may advantageously provide an increased capability of the shock strut 11 when reacting side loads applied to the landing gear. The longitudinal overlap 71 is generally defined by upper and lower bearings 74, 76. By way of example, when the piston 30 is fully stroked or deployed into the cylinder 32 (e.g., bottomed out), the spacing between the bearings 74, 76 will be the greatest and therefore the structural cooperation between the piston 30 and the cylinder 32 will be the greatest. Consequently, the relief device 70 permits the shock strut 11 to accommodate higher side loads acting on the landing gear without the need to increase the thickness, and hence weight, of the various shock strut 11 components.

The relief device 70 may take the form of an accumulator that displaces a fixed amount of gas, a frangible element that ruptures at a pre-determined pressure, a pressure relief valve that opens at a pre-determined pressure, or some combination thereof. Still referring to FIG. 2, the relief device 70 includes a pressure relief valve 72 in fluid communication with the sealed chamber 42, and more specifically in fluid communication with an upper portion of the sealed chamber 42 having only the compressible gas 45. It is appreciated however, that in view of fluid transfer dynamics within the sealed chamber 42, the pressure relief valve 72 may more accurately be in fluid communication with a mixture of the compressible gas 45 and the liquid 43.

Actuation of the relief valve 72 may be triggered when the applied load to the landing gear exceeds a maximum operating load and/or when the pressure within the sealed chamber 42, exceeds a maximum operating pressure. Although these conditions may generally coincide with one another, such is not necessary given the complexities and nuances of how load may be transferred through the landing gear structure. In one embodiment, operation of the relief device 70 is not triggered until a limit or ultimate load condition is encountered by the landing gear. It is appreciated that other loads and/or pressures may be utilized to trigger the relief device 70.

By way of example, a hard landing condition may trigger the relief valve 72 to open and vent at least some of the compressible gas 45 from the sealed chamber 42. This venting may direct the vented compressible gas to atmosphere, but preferably directs the vented compressible gas to a containment reservoir 78. This will reduce the pressure and quantity of gas in the chamber 42, allowing the piston 30 to non-resiliently collapse into the cylinder 32 and thus achieve the advantageous structural capabilities described above.

As will be appreciated, the relief device 70 should be configured to trigger above the maximum operating pressure anticipated in service to avoid inadvertent movement of the shock strut 11 under normal operating conditions. The increased shock strut 11 stroke and "capped" internal pressure may advantageously reduce or eliminate the structural reinforcements that are typically necessary for the shock strut 11 to meet design limit and/or ultimate load requirements.

Figure 3:
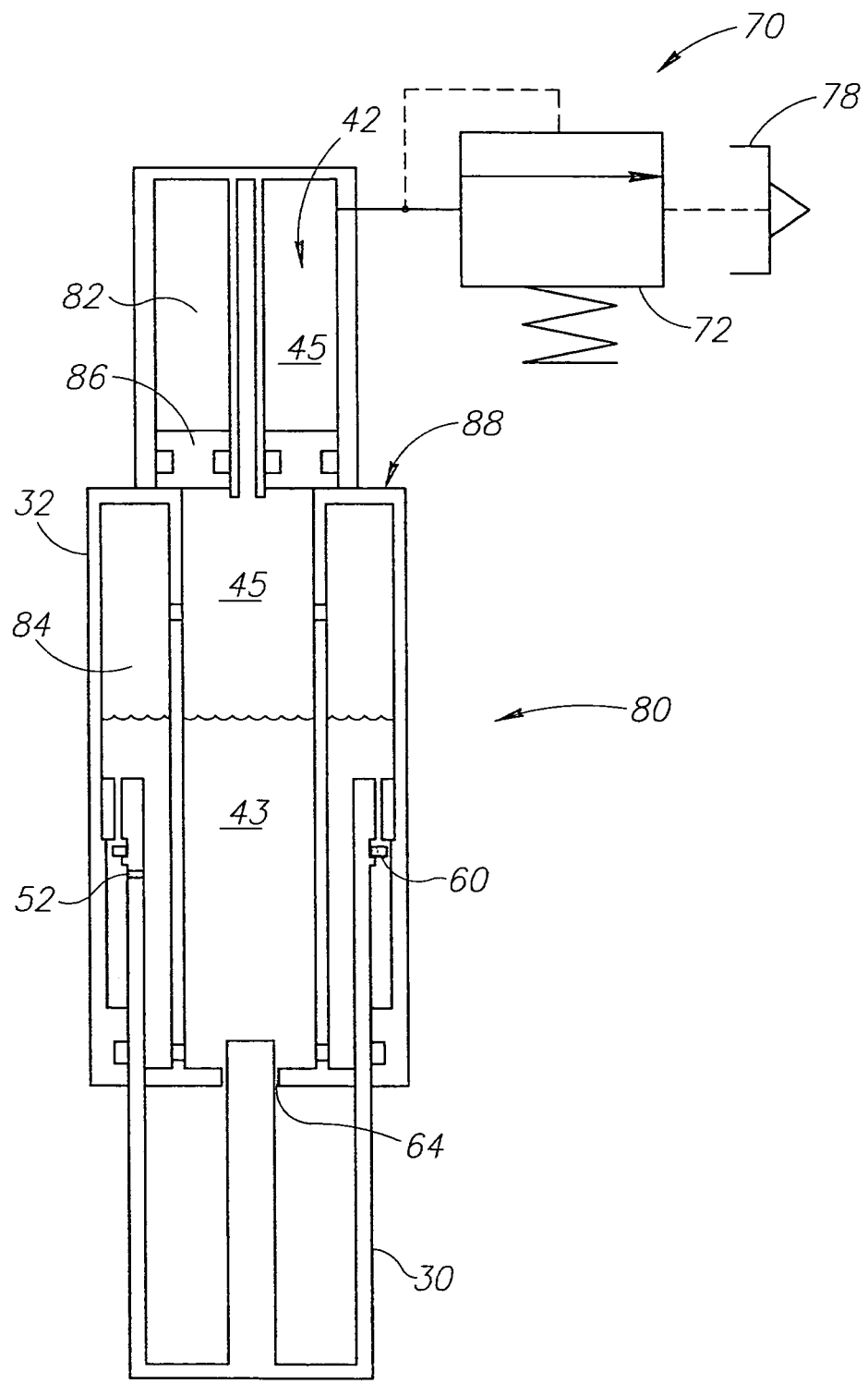
FIG. 3 is a schematic cross-sectional view of dual chamber shock absorber with a relief device according to an embodiment of the present invention.

FIG. 3 shows a shock strut 80 that is similar in many respects to the shock strut 11, described above, and thus like reference numerals are used to designate like components. In the illustrated embodiment, the sealed chamber 42 includes at least two sections, upper section 82 and lower section 84, both of which contain the compressible gas 45. Further, the cylinder 32 receives an upper piston 86 that is movable in an upper portion of the cylinder 32. Because of the upper piston 86, the upper section 82 may be pressurized at a higher pressure than the lower section 84. As a result, the upper piston 86 is nominally urged to be seated against an intermediate shelf surface 88 of the cylinder 32.

During light load conditions, the shock strut 80 will function similar to the shock strut 11. Once the maximum operating load or pressure is exceeded, the pressure in the lower section 84 exceeds the pressure in the upper chamber 82 and forces the upper piston 86 to move upward to effectively increases a working volume of the sealed chamber 42, which in turn changes a spring constant of the shock strut 80 under such higher load conditions.

By way of a second example involving a hard landing, when a pressure setting of the relief device 70, and more particularly the pressure relief valve 72 or the frangible device, is exceeded the relief device vents compressible gas 45 from the upper section 82 of the sealed chamber 42. As noted above, the vented gas may be released to the atmosphere or to the containment reservoir 78. The venting process reduces the pressure and quantity of the compressible gas 45 in the upper section 82, which allows the upper piston 86 to move upward and allows the piston 30 to at least partially, non-resiliently enter into the cylinder 32. In this embodiment, the lower section 84 may continue to provide some limited resiliency, but with the piston 30 substantially received into the cylinder 32.

Although the invention has been shown and described with respect to certain illustrated embodiment, equivalent alterations and modifications will occur to others skilled in the art upon reading and understanding the written description and the drawings. For example, although the embodiments of the shock struts described herein are directed to aircraft landing gear systems, such a shock strut may have other applications outside of an aeronautical or aerospace environment. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An aircraft landing gear shock strut, comprising:
    a cylinder;
    a piston telescopically movable within the cylinder to provide a piston-cylinder assembly;
    a sealed chamber defined by an arrangement of the piston-cylinder assembly, the sealed chamber having an upper section and a lower section separated by an upper piston, the upper section and the lower section each having a compressible gas that resists movement of the piston relative to the cylinder in response to a load applied to the strut causing the piston to compress the compressible gas, wherein the upper piston is configured to move toward the upper section in response to pressure in the sealed chamber exceeding a first pressure threshold; and a relief device in fluid communication with the upper section, the relief device configured to release at least some of the compressible gas in response to the pressure in the sealed chamber exceeding a second pressure threshold that is higher than the first pressure threshold, wherein the second pressure threshold is above a maximum operating pressure of the aircraft landing gear shock strut, and wherein the amount of compressible gas released is sufficient to reduce the pressure in the sealed chamber and thereby permit the piston to extend telescopically further into the cylinder by an amount that increases at least a bending strength capability of the piston-cylinder assembly, and wherein the relief device includes an accumulator in fluid communication with the sealed chamber, the accumulator configured to receive a quantity of the compressible gas from the sealed chamber.

2. The shock strut of claim 1, wherein the sealed chamber further includes a liquid in fluid communication with the compressible gas.

3. The shock strut of claim 2, wherein the liquid includes a hydraulic fluid.

4. The shock strut of claim 1, wherein the compressible gas includes Nitrogen gas.

5. The shock strut of claim 1, wherein the relief device includes a pressure relief valve in fluid communication with the sealed chamber.

6. The shock strut of claim 1, wherein the relief device includes a frangible apparatus configured to rupture at a desired pressure.

7. An aircraft landing gear shock strut, comprising:
a cylinder;
a piston telescopically movable within the cylinder to provide a piston-cylinder assembly;
a sealed chamber defined by an arrangement of the piston-cylinder assembly, the sealed chamber having an upper section and a lower section separated by an upper piston, the upper section and the lower section each having a compressible gas and the lower section further having a hydraulic liquid, the compressible gas and liquid configured to resist movement of the piston relative to the cylinder, wherein the piston is movable to a first position within the cylinder in response to the compressible gas reaching a maximum operating pressure, wherein the upper piston is configured to move toward the upper section in response to pressure in the sealed chamber exceeding a first pressure threshold; and a relief device in fluid communication with the upper section, the relief device activatable to release at least some of the compressible gas in response to the pressure in the sealed chamber exceeding a second pressure threshold that is higher than the first pressure threshold, wherein the second pressure threshold is above a maximum operating pressure of the aircraft landing gear shock strut, wherein activation of the relief device permits the piston to telescopically move beyond the first position to increase a side load capability of the piston-cylinder assembly, and wherein the relief device includes an accumulator in fluid communication with the sealed chamber, the accumulator configured to receive the compressible gas released from the sealed chamber.

8. The shock strut of claim 7, wherein the compressible gas includes Nitrogen gas.

9. The shock strut of claim 7, wherein the relief device includes a pressure relief valve in fluid communication with the sealed chamber.

10. The shock strut of claim 7, wherein the relief device includes a frangible apparatus configured to rupture at the desired pressure.

* * * * *